United States Patent [19]
Tanaka et al.

[11] Patent Number: 5,839,008
[45] Date of Patent: Nov. 17, 1998

[54] APPARATUS PROVIDED WITH A FILM FRAME JUDGEMENT DEVICE

[75] Inventors: Yoshiyuki Tanaka, Sakai; Toshihito Kido, Matsubara, both of Japan

[73] Assignee: Minolta Co., Ltd., Osaka, Japan

[21] Appl. No.: 48,162

[22] Filed: Mar. 26, 1998

Related U.S. Application Data

[62] Division of Ser. No. 801,392, Feb. 20, 1997.

[30] Foreign Application Priority Data

Feb. 21, 1996 [JP] Japan .................................. 8-34031

[51] Int. Cl.$^6$ .............................. G03B 17/24; G11B 5/00
[52] U.S. Cl. .................................. 396/319; 360/1; 360/25
[58] Field of Search ........................... 396/319; 360/1, 360/25

[56] References Cited

U.S. PATENT DOCUMENTS

| | | | |
|---|---|---|---|
| 5,598,236 | 1/1997 | Ueda et al. | 396/319 |
| 5,727,240 | 3/1998 | Mizumoto et al. | 396/319 X |

*Primary Examiner*—W. B. Perkey
*Attorney, Agent, or Firm*—McDermott, Will & Emery

[57] ABSTRACT

A camera includes a feeder for feeding a film having magnetic recording portions, a reader for magnetically scanning magnetic recording portions to generate scan signals, and a judger for judging whether or not a magnetic recording portion has been recorded with magnetic data by comparing scan signals with a threshold value, and a warning device for generating a warning when judgment of the judger is impossible. This apparatus can ensure more accurate judgment as to whether a signal picked up from each recording portion is a magnetic signal.

4 Claims, 16 Drawing Sheets

APPARATUS PROVIDED WITH A FILM FRAME JUDGEMENT DEVICE

This is a divisional application of Ser. No. 08/801,392, filed Feb. 20, 1997.

BACKGROUND OF THE INVENTION

This invention relates to an apparatus using a film, such as a camera, provided with a film frame judgment device for detecting a signal by relatively scanning a recording portion of a fed film by an information reading head and judging based on the detected signal whether an image is recorded in a frame corresponding to the recording portion.

In recent years, the standardization of a novel photographing system has been promoted. In a film used for this novel photographing system, strip-like magnetic recording tracks (hereinafter, referred to as "magnetic recording portion") are provided in parallel to the exposure areas of the respective frames at one side along the length of the film. Pieces of information concerning the photographing such as a date of photographing and an exposure value (hereinafter, referred to as "film photographing information") are magnetically recorded in the magnetic recording portions in correspondence with the frames.

In the film used for the novel photographing system, a light blocking lid is provided at a film outlet of a film cartridge as disclosed in, e.g., U.S. Pat. No. 5,347,334, and the film is completely contained in the film cartridge. Further, a bar code plate by which the state of the contained film (an unexposed film, an exposed film, a film which is exposed halfway (hereinafter, "a partly exposed film), a developed film, etc.) is detectable is integrally rotatably provided at one end of a spool. The state of the film can be distinguished by reading a bar code on the bar code plate. Accordingly, even if the partly exposed film is rewound into the film cartridge and taken out of the camera, it can be loaded in the camera again to record images in unexposed frames. Further, a developed film can be stored by being contained in the film cartridge.

In order to enable the image recording from the first unexposed frame of the partly exposed film reloaded in the camera, there has been proposed a film frame judgment device for detecting signals by scanning the respective magnetic recording portions of the loaded film by a magnetic head and judging whether the detected signal is a magnetic signal to judge whether the frame corresponding to this magnetic recording portion is exposed.

FIG. 20 is a circuit construction diagram of a magnetic signal judging circuit of a prior art film frame judgment device.

A prior art magnetic signal judger 100 includes a magnetic head 101 for picking up magnetic signals recorded in magnetic recording portions of a film F, a magnetic signal processing circuit 102 for amplifying the picked up signal (hereinafter, "pick-up signal") to a predetermined specified voltage, and a magnetic signal judging circuit 103 for judging whether the pick-up signal is a normal magnetic signal.

The magnetic signal judging circuit 103 takes only ac components $V_b$ from an output signal $V_a$ of the magnetic signal processing circuit 102 by eliminating dc components $V_{DC}$, generates a pulsating signal $V_c$ (a signal corresponding to an envelope level of amplitude variation of the ac components $V_b$) having low frequency components by rectifying and smoothing the ac components $V_b$, and then judges whether the pick-up signal is a normal magnetic signal by comparing the pulsating signal $V_c$ with a reference voltage $V_{ref}$ input from a camera CPU 107.

A CR circuit constructed by a capacitor C1 and a resistor R1 at an input side of the magnetic signal judging circuit 103 extracts the ac components $V_b$ from the output signal $V_a$. A diode D after the CR circuit rectifies the ac components $V_b$. Further, a CR circuit constructed by capacitors C2, C3 and resistors R2, R3 smoothes the rectified ac components $V_b$ and generates the pulsating signal $V_c$. A comparator COMP compares the pulsating signal $V_c$ with the reference voltage $V_{ref}$, and outputs a high level signal $V_d$ representing that the pick-up signal is a normal magnetic signal when the pulsating signal $V_c$ is equal to or above the reference voltage $V_{ref}$ while outputting a low level signal $V_d$ representing that the pick-up signal is not a normal magnetic signal when the pulsating signal is below the reference voltage $V_{ref}$.

Whether or not the film photographing information is recorded in the magnetic recording portion of each frame of the film is made as follows.

Specifically, a feed roller 104 is rotated by a feed motor 105 with the magnetic head 101 pressed against the magnetic recording portion of the film F, thereby feeding the film F in a winding direction. The signal in the magnetic recording portion is picked up by detecting voltages induced at the opposite ends of the magnetic head 101 by electromagnetic induction. The feeding speed and feeding direction of the film F are controlled by controlling the rotating speed and rotating direction of the feed motor 105 by a motor driver 106.

The signal picked up by the magnetic head 101 is amplified to the specified voltage level by the magnetic signal processing circuit 102. Thereafter, in the magnetic signal judging circuit 103, the pulsating signal $V_C$ corresponding to the envelope level of the amplitude variation of the pick-up signal is generated; the judgment as to whether the pick-up signal is a normal magnetic signal representative of the film photographing information by comparing the pulsating signal $V_c$ with the reference voltage $V_{ref}$; and outputs a signal representative of the judgment result (the output signal $V_d$ of the comparator COMP) to the camera CPU 107.

The prior art magnetic signal judger 100 picks up the signal in the magnetic recording portion of the film F; extracts the pulsating signal $V_c$ containing the low frequency components of the amplitude variation from the pick-up signal; and judges based only on the signal level of the pulsating signal $V_c$ whether the pick-up signal is a normal magnetic signal. Accordingly, an error judgment may be made for the pick-up signal due to the variation of the level of the magnetic signal resulting from a burst type noise coming from the outside, a signal-to-noise (S/N) characteristic of the magnetic recording portion and the variation of feeding speed of the film.

The magnetic layer of the magnetic recording portion of the film F has a lower magnetic density as compared with acoustic and video magnetic tapes. The S/N characteristic of the magnetic recording portion of the film F is not necessarily sufficient, and the film feeding system is not designed specially to read the magnetic signal recorded in the film F. Accordingly, in writing and reading the magnetic signal in and from the magnetic recording portion, the level of the magnetic signal may fall or lack as shown in FIG. 21, with the result that the magnetic signal may be erroneously judged not to be a magnetic signal because of a lacking portion despite the fact that this signal is a magnetic signal. In FIG. 21, the signal lacks in a portion A, where the level of the pick-up signal $V_a$ is a noise level.

For example, in the case that the above judgment is made near a television receiver, a scanning line noise (a noise resulting from a vertical synchronization signal) of the television receiver may enter the pick-up signal $V_a$. In such a case, if the level of the pick-up signal which is not a normal magnetic signal is largely changed by a burst type noise $S_B$ resulting from the scanning line noise as shown in FIG. 22, this noise $S_B$ may be erroneously judged to be a normal magnetic signal.

It can be considered to avoid the maloperation of the magnetic signal judger 100 by a circuit construction. However, since such a hardware measure leads to a complicated circuit construction and a difficult circuit design, it cannot be adopted because it is not necessarily effective in terms of a production cost.

SUMMARY OF THE INVENTION

It is an object of the present invention to provide an apparatus which has overcome the problems residing in the prior art.

It is another object of the present invention to provide an apparatus provided with a film frame judgment device which can accurately judge whether a signal picked up from each recording portion is a magnetic signal.

According to an aspect of the present invention, an apparatus comprising: a feeder which feeds a film having a magnetic recording portion; a reader which magnetically scans the magnetic recording portion to generate scan signals; and a judger which executes a first comparison and a second comparison to make judgment as to which of first, second, and third cases. The first case is one that the magnetic recording portion has been recorded with magnetic data; the second case is one that the magnetic recording portion has not been recorded with magnetic data; and the third case is one that the first and second cases cannot be discriminated. The first comparison compares a scan signal from each of a plurality of blocks of the magnetic recording portion with a first predetermined level. The second comparison compares a scan signal from each of the plurality of blocks of the magnetic recording portion with a second predetermined level, the second predetermined level being lower than the first predetermined level. The first comparison is given higher priority than the second comparison.

The judger may preferably make a judgment of: the first case when scan signals are in a first condition of being above the first predetermined level over a specified number of continuous blocks; the third case when scan signals are in a second condition of being below the first predetermined level and above the second predetermined level over a specified number of continuous blocks; and the second case when scan signals are in the other condition.

The first predetermined level may be a threshold value for judging whether scan signals are in connection with magnetic data. The second predetermined level may be a threshold value for judging whether scan signals are in connection with noise.

It may be appreciated that the film apparatus is a camera.

According to another aspect of the present invention, a film apparatus comprising: a feeder which feeds a film having a non-magnetic recording portion and a magnetic recording portion; a reader which magnetically scans the non-magnetic recording portion and the magnetic recording portion to generate scan signals, scanning of the non-magnetic recording portion being held for a predetermined period of 20 milliseconds or more; and a judger which makes a threshold value based on scan signals from the non-magnetic recording portion and judges whether or not the magnetic recording portion has been recorded with magnetic data by comparing scan signals with the threshold value.

The threshold value may be made based on an average of scan signals from the non-magnetic recording portion.

The threshold value may be made based on an average of scan signals from divisions of the non-magnetic recording portion except maximum and minimum scan signals.

The threshold value may be made based on a median of scan signals from divisions of the non-magnetic recording portion.

According to still another aspect of the present invention, a film apparatus comprising: a feeder which feeds a film having a magnetic recording portion; a reader which magnetically scans the magnetic recording portion to generate scan signals; and a judger which judges whether or not the magnetic recording portion has been recorded with magnetic data by comparing scan signals with a threshold value; and a warning provider which provides a warning when judgment of the judger is impossible.

It may be preferable that the warning provider activates rewinding of the film.

These and other objects, features and advantages of the present invention will become more apparent upon a reading of the following detailed description and accompanying drawings.

DETAILED DESCRIPTION OF THE PREFERRED EMBODIMENT OF THE INVENTION

Figure 1:
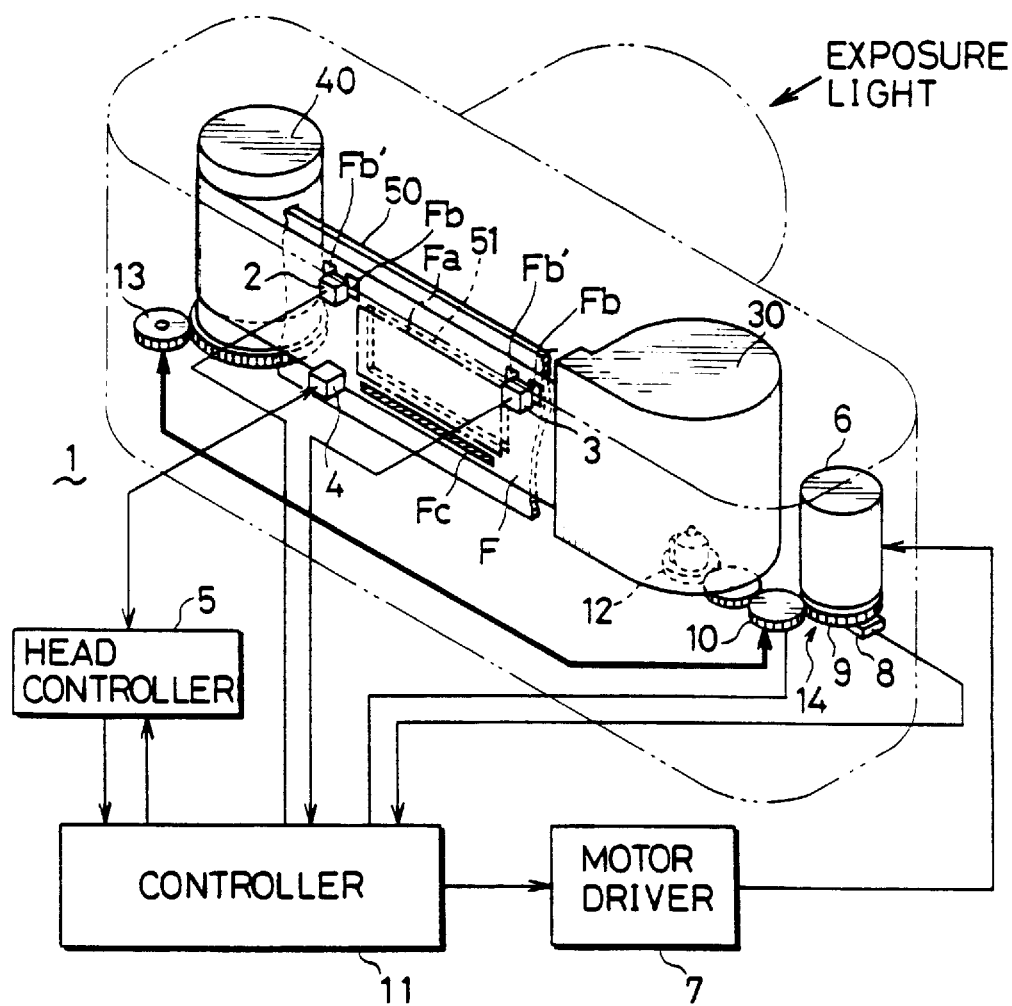
FIG. 1 is a schematic construction diagram of a camera embodying the present invention provided with a film frame judgment device.

FIG. 1 is a schematic construction diagram of a camera embodying the present invention provided with a film frame judgment device.

In FIG. 1, a camera 1 is provided with a film frame judgment device. In this figure, identified by 30 is a film cartridge loaded in a cartridge chamber provided at one end portion of the camera main body, by 40 a take-up spool rotatably provided in a film take-up chamber at the other end portion of the camera main body, and by 50 an exposure frame provided between the cartridge chamber and the film take-up chamber and behind a taking lens. The exposure frame 50 acts as a guide plate for feeding a film F pulled out of the film cartridge 30 to the film take-up chamber and is provided in its substantially center portion with a rectangular exposure aperture 51 of specified size (e.g., about 17 mm (height)×about 30 mm (width)) so as to restrict a projection of an object image to the film F.

The film F includes a plurality of frames Fa along its length and are formed along one edge portion (upper edge portion in FIG. 1) with pairs of perforations Fb, Fb' indicative of exposure areas of the frames Fa in correspondence with the frames Fa. The perforations Fb, Fb' indicate front and rear end positions of the corresponding frame Fa with respect to a film winding direction, respectively, and are formed in specified positions at the opposite ends of each frame Fa.

Strip-like magnetic recording portions Fc having a specified length L (e.g. 22 mm) are provided in correspondence with the respective frames Fa along the other edge portion (lower edge portion in FIG. 1) of the film F. Each magnetic recording portion Fc is adapted to magnetically record a film photographing information (including photographing conditions such as a date of photographing, an exposure value and an exposure correction, a framing information, and a print size information (standard/panorama)) concerning the photographing of the corresponding frame Fa.

The film photographing information is written in the magnetic recording portion Fc by a magnetic head 4 to be described later during film winding after an image is recorded in the corresponding frame Fa.

The respective pieces of information constituting the film photographing information are expressed in binary data including specified number of digits. Data of "0" and "1" constituting this binary data are written in the magnetic recording portion Fc in the form of a bit signal Pb having a waveform as shown in FIG. 3.

Figure 3:
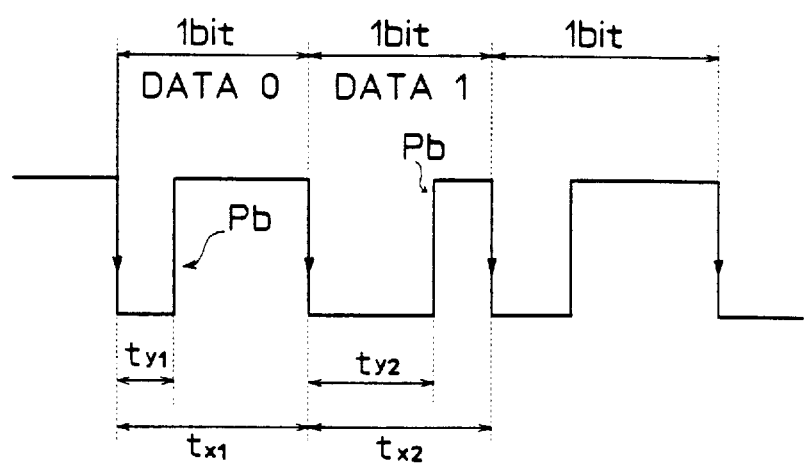
FIG. 3 is a diagram showing an exemplary waveform of a bit signal Pb representing a film photographing information.

The bit signal Pb shown in FIG. 3 is such that two kinds of pulse signals having different duty ratios ($t_y/t_x$) are allotted to the data "0" and "1". Although a cycle $t_x$ of the bit signal Pb changes depending on a feeding speed v of the film F, since the duty ratios do not change, the content, i.e. "0" or "1" of each bit signal Pb can be judged based on its duty ratio.

A signal representing the film photographing information (hereinafter, "Ix-signal") which is to be written in the magnetic recording portion Fc is specified to consist of at least 248 bits. Since the length of the magnetic recording portion is 22 mm, a minimum bit density Db is 11.3 bits/mm (=248 bits/22 mm). Any writing condition which satisfies the above writing condition can be selectively set in the camera.

The feeding speed v of the film F when the film photographing information is written is set in a range of, e.g. 50 mm/s to 200 mm/s. A minimum frequency $f_{MIN}$ of the Ix-signal picked up from the magnetic recording portion Fc is set at 563.6 Hz (=50 mm/s×11.3 bits/mm).

Referring back to FIG. 1, the film frame judgment device includes photointerrupters 2, 3 for detecting the perforations Fb, Fb', a magnetic head 4 for writing and reading the film information in and from the magnetic recording portion Fc, a head controller 5 for controlling the driving of the magnetic head 4, a motor 6 as a drive source for feeding the film F, a motor driver 7 for controlling the driving of the motor 6, a pulse plate 8 and a photoreflector 9 for monitoring a rotation amount of the motor 6, a torque transmission mechanism 10, and a controller 11. The torque transmission mechanism 10 switchingly transmits a torque of the motor 6 to a driving axis 12 fitted into the spool of the film cartridge 30 and a drive gear 13 of the take-up spool 40. The controller 11 controls the driving of each element to write and read the film photographing information and to make a judgment for each frame.

The photointerrupter 2 (hereinafter, "PI 2") is arranged in a position in the vicinity of an upper corner portion of the exposure aperture 51 at the side to the take-up spool 40 where it faces a movement path of the perforations Fb, Fb'. The photointerrupter 3 (hereinafter, "PI 3") is arranged in a position in the vicinity of an upper corner portion of the exposure aperture 51 at the side to the cartridge chamber where it faces the movement path of the perforations Fb, Fb'.

Figure 2:
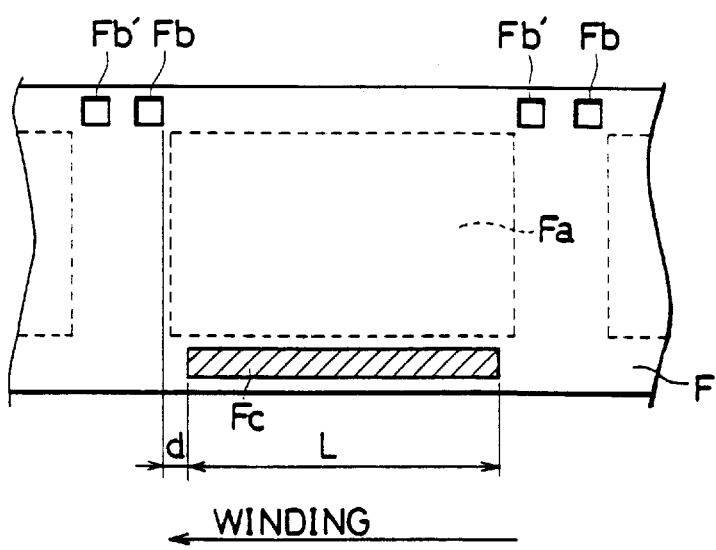
FIG. 2 is a diagram showing a magnetic recording portion provided in a film.

The PI 2 is adapted to position the exposure area of each frame Fa with respect to the exposure aperture 51 and to detect start timings of the writing and reading of the film photographing information in and from the magnetic recording portion Fc of each frame. More specifically, when the film F is fed until the perforation Fb is detected by the PI 2, the exposure area of this frame Fa coincides with the exposure aperture 51. Further, the front end position of the magnetic recording portion Fc is displaced from the perforation Fb by a specified distance d as shown in FIG. 2. The writing and reading of the film photographing information in and from the magnetic recording portion Fc are performed by controlling the driving of the magnetic head 4 upon feeding the film F by the distance d from the detection position of the perforation Fb by the PI 2. The PI 2 detects the perforations Fb, Fb' based on a change in the detection signal resulting from the fact that the interruption of a light path is released by the holes.

The PI 3 detects the leading end of the film F coming out of the film outlet of the film cartridge 30. The PI 3 detects the leading end of the film F based on a change in the detection signal resulting from the fact that a light path is interrupted by the film F. The detection signals of the PIs 2 and 3 are input to the controller 11.

The leading end of the film F is detected by the PI 3 to securely detect a noise signal by the magnetic head 4 and to set judgment threshold values when judging based on the presence or absence of the Ix-signal whether each frame is exposed or unexposed during the loading of the film F. More specifically, when the magnetic head 4 is driven upon the detection of the leading end of the film F by the PI 3, the film F has not yet reached the magnetic head 4. Accordingly, a signal (noise signal) in an area other than the magnetic recording portions Fc can securely be detected. The setting of the judgment threshold value is described in detail later.

Figure 4:
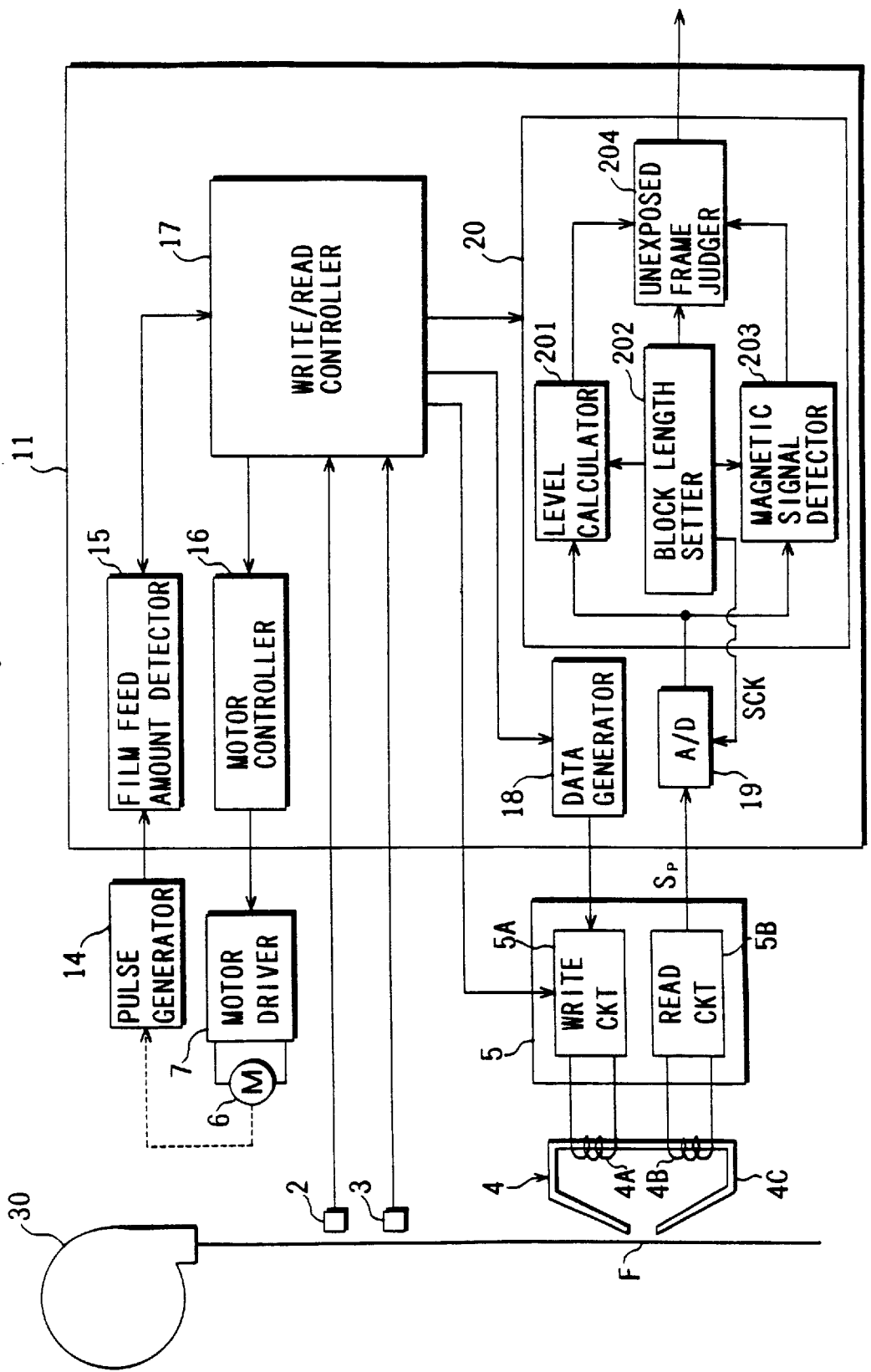
FIG. 4 is a block diagram of a control system of the film frame judgment device.

In order to have a small size, the magnetic head 4 is constructed by a head of core sharing type in which a write coil 4A and a read coil 4B are wound around a single ring-shaped core 4C (see FIG. 4). The head controller 5 includes a magnetic signal writing circuit 5A connected with the write coil 4A and a magnetic signal reading circuit 5B connected with the read coil 4B (see FIG. 4).

The magnetic signal writing circuit 5A converts a direct current into an alternating current based on the Ix-signal (bit signal Pb) which represents the film photographing information and is output from the controller 11 and supplies the obtained alternating current to the write coil 4A. When the alternating current flows in the write coil 4A, a fluctuating magnetic field corresponding to the magnetic signal is generated at a gap of the magnetic head 4. The film photographing information is recorded by magnetizing the magnetic recording portion Fc by this fluctuating magnetic field.

The magnetic signal reading circuit 5B is mainly constructed by an amplifier and is adapted to amplify the signal detected by the magnetic head 4 by superimposing it on a specified dc bias level and to output the amplified signal. Specifically, the circuit 5B has an output voltage range of, e.g. 0 to 5 V, and amplifies and outputs the signal detected by the magnetic head 4 into a signal having 2.5 V as a center point and an amplitude of 2.5 V or smaller.

The motor 6 includes an electric motor such as a stepping motor. The motor driver 9 generates a control signal (e.g., a pulse train signal) to the motor 6 and outputs it to the motor 6 so as to control the rotating speed, rotation amount, activation/deactivation and the like of the motor 6.

The pulse plate 8 and the photoreflector 9 construct a pulse generator 14 (see FIG. 4) for generating a pulse train signal to detect the rotation amount, the rotating speed and the like of the motor 6. The pulse plate 8 is a disk formed at its periphery with strips or grooves having a shape of gear teeth which are circumferentially arranged at specified intervals. By detecting the stripes or grooves by the photoreflector 9, a pulse train signal of a cycle corresponding to the rotating speed of the pulse plate 8 is generated. This pulse train signal is output to the controller 11.

The torque transmission mechanism 10 includes a speed reducing/drive transmitting portion constructed by a combination of planetary gear devices and a drive direction switching portion for switching the connection of gear trains by a cam, and switches the transmission direction of the torque of the motor 6 by switching the position of the cam. The camera is provided with three torque transmission modes: a wind mode, a rewind mode and a thrust mode. In the wind mode, the torque of the motor 6 is transmitted to the drive gear 13 via the torque transmission mechanism 10, with the result that the film F is fed in the winding direction by the rotation of the take-up spool 40.

In the rewind mode, the torque of the motor 6 is transmitted to the fork 12 and the spool to which the fork 12 is fitted via the torque transmission mechanism 10, with the result that the film F is fed in the rewinding direction by the rotation of the spool of the film cartridge 30. The thrust mode is a drive mode for the film loading. In this mode, the torque of the motor 6 is transmitted to the fork 12 and the drive gear 13 via the torque transmission mechanism 10, with the result that the film F is thrusted out of the film cartridge 30 by the rotation of the spool of the film cartridge 30. After the film F is nipped by the take-up spool 40, the film F is fed in the winding direction until the exposure area of the leading frame Fa reaches the exposure aperture 51 by the rotation of the spool and the take-up spool 40.

Figure 5:
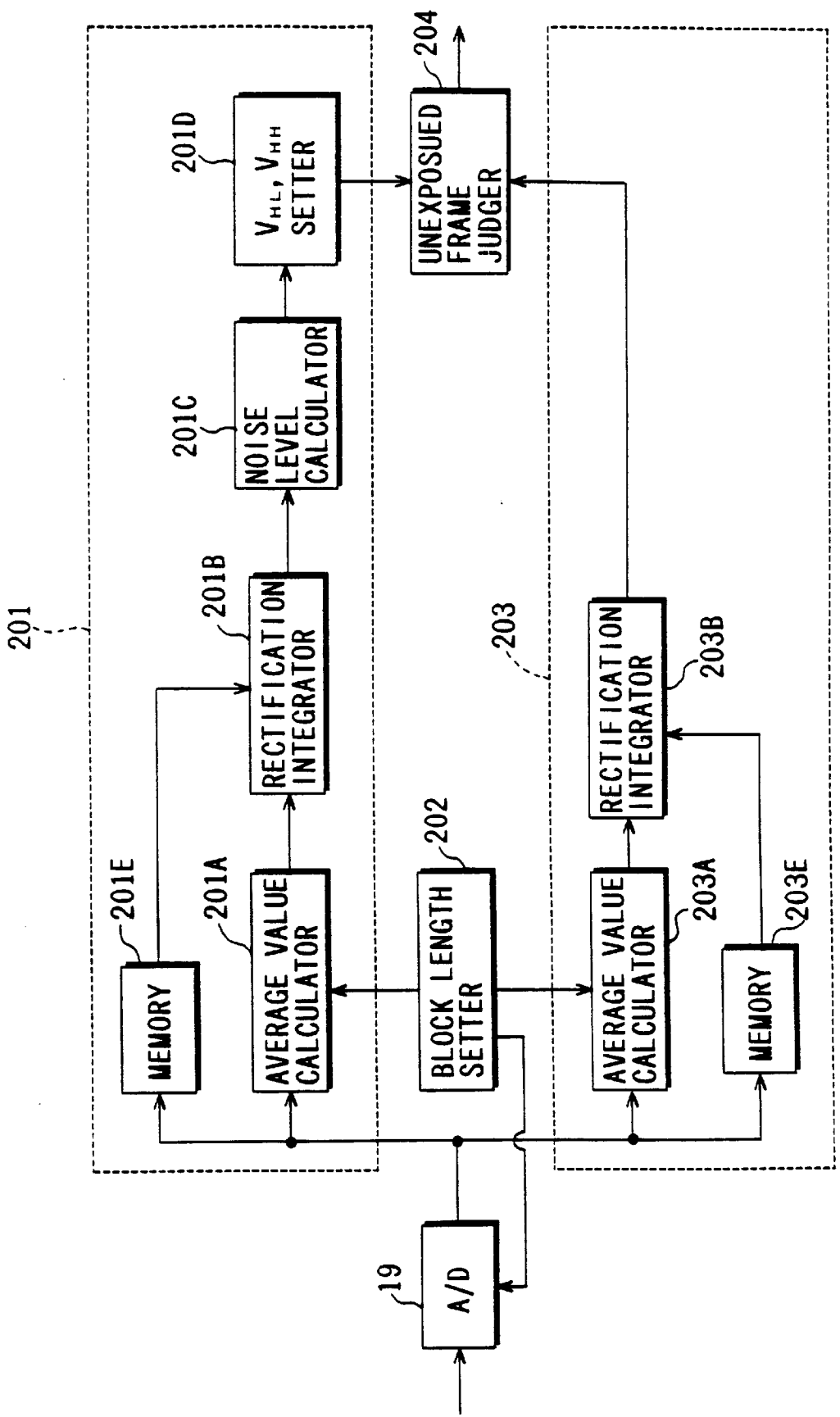
FIG. 5 is a block diagram showing an internal construction of a film frame judgment device.

FIG. 4 is a block diagram of a control system of the film frame judgment device 1, and FIG. 5 is a block diagram showing the internal construction of a film frame judgment device. In FIG. 4, the same elements as those shown in FIG. 1 are identified by the same reference numerals.

The controller 11 is provided with a film feed amount detector 15, a motor controller 16, a write/read controller 17, a write data generator 18, an analog-to-digital (A/D) converter 19 and a frame judging section 20.

The film feed amount detector 15 detects the feeding speed and the feed amount of the film F based on the pulse train signal input from the pulse generator 14. Specifically, the detector 15 detects a pulse duration $\tau$ (sec.) of the pulse train signal, and calculates the feeding speed v from this pulse duration $\tau$ and a pulse number $N_P$ per rotation of the motor 6. Assuming that the film F is fed by S (mm) by one turn of the motor 6, the feeding speed v is calculated by $S/(\tau \times N_P)$. The detector 15 also calculates the feed amount D of the film F by adding a pulse number N. The feed amount D is calculated by $N \cdot S/N_P$. The detection data of the detector 15 are input to the write/read controller.

The motor controller 16 controls the drive and the driving direction of the motor 6. The motor controller 16 outputs a drive control signal to the motor driver 7 in accordance with a control signal from the write/read controller 17.

The write/read controller 17 controls the writing and reading of the film photographing information. The write/read controller 17 controls the feed of the film F via the motor controller 16 so as to relatively move the magnetic head 4 with respect to the film F, that is, so as to scan the film F. Further, as described later, during the film loading, the write/read controller 17 controls the drive of the frame judging section 20 to cause it to make a judgment for each frame (whether or not the frame is unexposed) based on the signal detected from the magnetic recording portion Fc.

Figure 6:
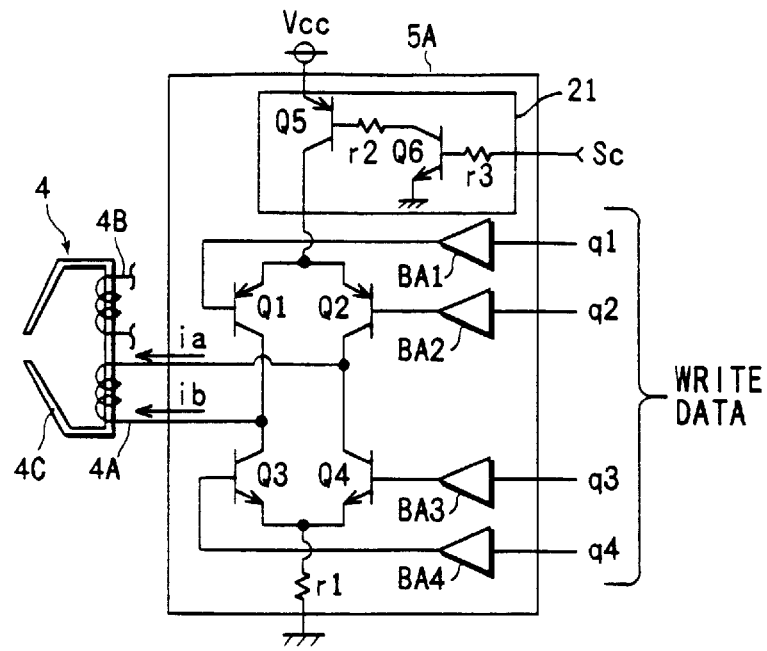
FIG. 6 is a diagram showing one exemplary circuit construction of a magnetic signal writing circuit.

The write data generator 18 generates a write data used to drive the magnetic head 4 based on the film photographing information represented by the bit signal Pb. The magnetic signal writing circuit 5A is constructed by an inverter circuit including four switching devices Q1 to Q4 as shown in FIG. 6. In this embodiment, the switching devices Q1, Q2 are pnp-type transistors, whereas the switching devices Q3, Q4 are npn-type transistors.

A series circuit formed by the transistors Q1, Q3 and a series circuit formed by the transistors Q2, Q4 are connected in parallel, and the write coil 4A is connected between a point of connection between the transistors Q1 and Q3 and a point of connection between the transistors Q2 and Q4. Further, the emitters of the transistors Q3, Q4 are grounded via a resistor r1, whereas the emitters of the transistors Q1, Q2 are connected with a dc power source Vcc via a switching circuit 21 constructed by switching devices Q5 and Q6.

The switching circuit 21 is adapted to completely interrupt a dc supply path from the dc power source Vcc to the magnetic signal writing circuit 5A when the magnetic head 4 is used as a reading head, thereby preventing a mutual induction action of the write coil 4A and the read coil 4B. The switching devices Q5, Q6 are a pnp-type transistor and an npn-type transistor, respectively. The emitter of the transistor Q5 is connected with the dc power source Vcc, and the connector thereof is connected with the emitters of the transistors Q1, Q2. The collector of the transistor Q6 is connected with the base of the transistor Q5 via a resistor r2, and the emitter thereof is grounded. To the base of the transistor Q6 is input a control signal $S_C$ for turning the transistor Q6 on and off via a resistor r3. The control signal $S_C$ is input to the magnetic signal writing circuit 5A from the write/read controller 17.

Upon the receipt of the control signal $S_C$ of high level, the transistor Q6 is turned on, and the base of the transistor Q5 becomes low level, thereby turning on the transistor Q5 (conductive state). On the other hand, upon the receipt of the control signal $S_C$ of low level, the transistor Q6 is turned off, and the base of the transistor Q5 becomes high level, thereby turning off the transistor Q5 (nonconductive state).

Figure 7:
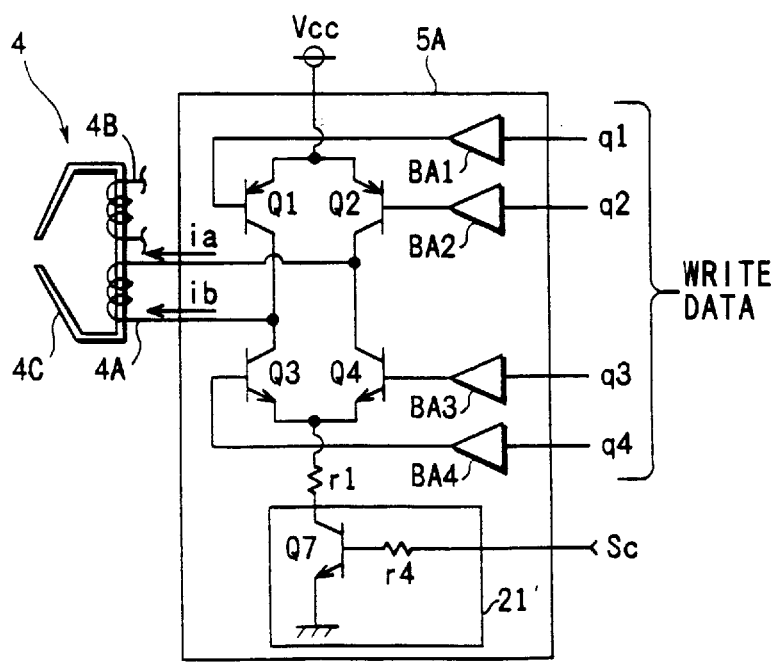
FIG. 7 is a diagram showing another exemplary circuit construction of the magnetic signal writing circuit.

Although the switching circuit 21 is provided between the dc power source Vcc and the transistors Q1, Q2 in FIG. 6, a switching circuit 21' may be provided between the resistor r1 and the ground as shown in FIG. 7. In FIG. 7, the switching circuit 21' is constructed by an npn-type transistor Q7, and the control signal $S_C$ is input to the base of the transistor Q7 via a resistor r4. In this case as well, upon the receipt of the control signal $S_C$ of high level, the transistor Q7 is turned on (conductive state). Upon the receipt of the control signal $S_C$ of low level, the transistor Q7 is turned off (nonconductive state).

The write data is input to the bases of the transistors Q1 to Q4 via buffer amplifiers BA1 to BA4. The transistors Q1, Q2 are turned on upon the receipt of a low level signal, whereas the transistors Q3, Q4 are turned on upon the receipt of a high level signal. Accordingly, if the write data is a 4-bit data (q1, q2, q3, q4) and "1" and "0" denote a high level signal and a low level signal, respectively, a write data (1, 1, 0, 0) is output from the write data generator 18 when the writing is not performed. Further, when the film photographing information is to be written, a write data (1, 0, 1, 0) is output from the write data generator 18 if there is a current ia flowing downward of the write coil 4A in FIG. 6. Conversely, a write data (0, 1, 0, 1) is output from the write data generator 18 if there is a current ib (=−ia) flowing upward of the write coil 4A in FIG. 6.

The write data generator 18 outputs the write data to the magnetic signal writing circuit 5A at a specified timing when the information is to be written in accordance with the control signal from the write/read controller 17.

The A/D converter 19 converts an analog signal $S_P$ input from the magnetic signal reading circuit 5B into a digital signal $S_P$. In this embodiment, the A/D converter 19 converts the analog signal $S_P$ into a 8-bit digital data. Specifically, the A/D converter 19 applies a sampling to the signal $S_P$ in a specified cycle in accordance with a sampling clock SCK input from a block length setter 202; converts the level of each sampling signal from an analog value into a digital value; and outputs the thus obtained digital data to the frame judging section 20 and an unillustrated information decoder for decoding the film photographing information from the magnetic signal.

The frame judging section 20 judges based on the level of the signal $S_P$ detected from the magnetic recording portion Fc whether the signal $S_P$ is an Ix-signal, and also judges based on the above judgment result whether the frame Fa corresponding to the magnetic recording portion Fc is unexposed or not.

The frame judging section 20 includes a threshold level calculator 201, the block length setter 202, a magnetic signal detector 203 and an unexposed frame judger 204.

The threshold level calculator 201 calculates threshold levels $V_{HL}$, $V_{HH}$ used to judge whether the signal $S_P$ detected in the magnetic recording portion Fc is an Ix-signal based on a signal $S_P'$ detected when the magnetic head 4 is located in a position outside the magnetic recording portion Fc (i.e. noise signal $S_P'$). The threshold level $V_{HL}$ is a level used to judge whether the signal $S_P$ is a noise signal, whereas the threshold level $V_{HH}$ ($>V_{HL}$) is a level used to judge whether the signal $S_P$ is an Ix-signal. The data on the threshold levels $V_{HL}$, $V_{HH}$ are output to the unexposed frame judger 204.

The threshold level calculator 201 includes, as shown in FIG. 5, an average value calculator 201A, a rectification integrator 201B, a noise level calculator 201C, a threshold level setter 201D, and a memory 201E. As described later, the frame judgment is made by dividing the magnetic recording portion Fc into a plurality of blocks and generating a judgment signal based on the signal $S_P$ detected block by block. The memory 201E is adapted to store the digital signal $S_P'$ input from the A/D converter 19 for each block length. The average value calculator 201A calculates an average level $V_{NAVE}$ of the digital signal $S_P'$ for each block. The rectification integrator 201B applies a full wave rectification to the digital signal $S_P'$ on the basis of the average level $V_{NAVE}$, and integrates this rectification signal. The noise level calculator 201C calculates a noise level K by averaging integral values $S_N$ calculated for a plurality of blocks (=$\Sigma S_N$/n: n=the number of blocks).

Figure 8:
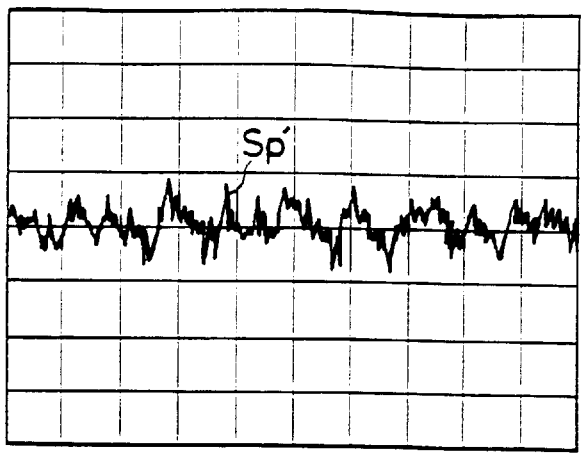
FIG. 8 is a waveform chart showing an exemplary noise detection signal.
Figure 9:
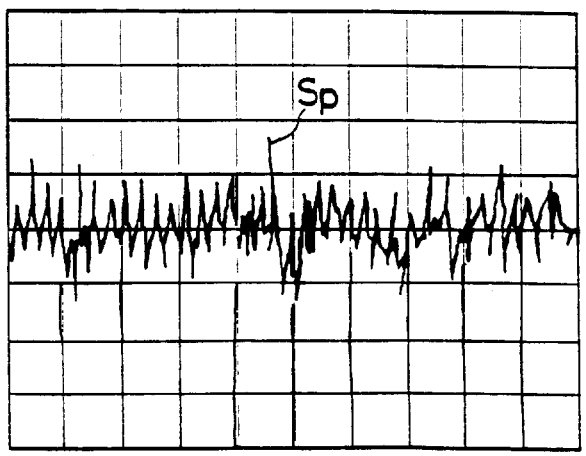
FIG. 9 is a waveform chart showing an exemplary detecting signal when a magnetic signal having a low level is detected.
Figure 10:
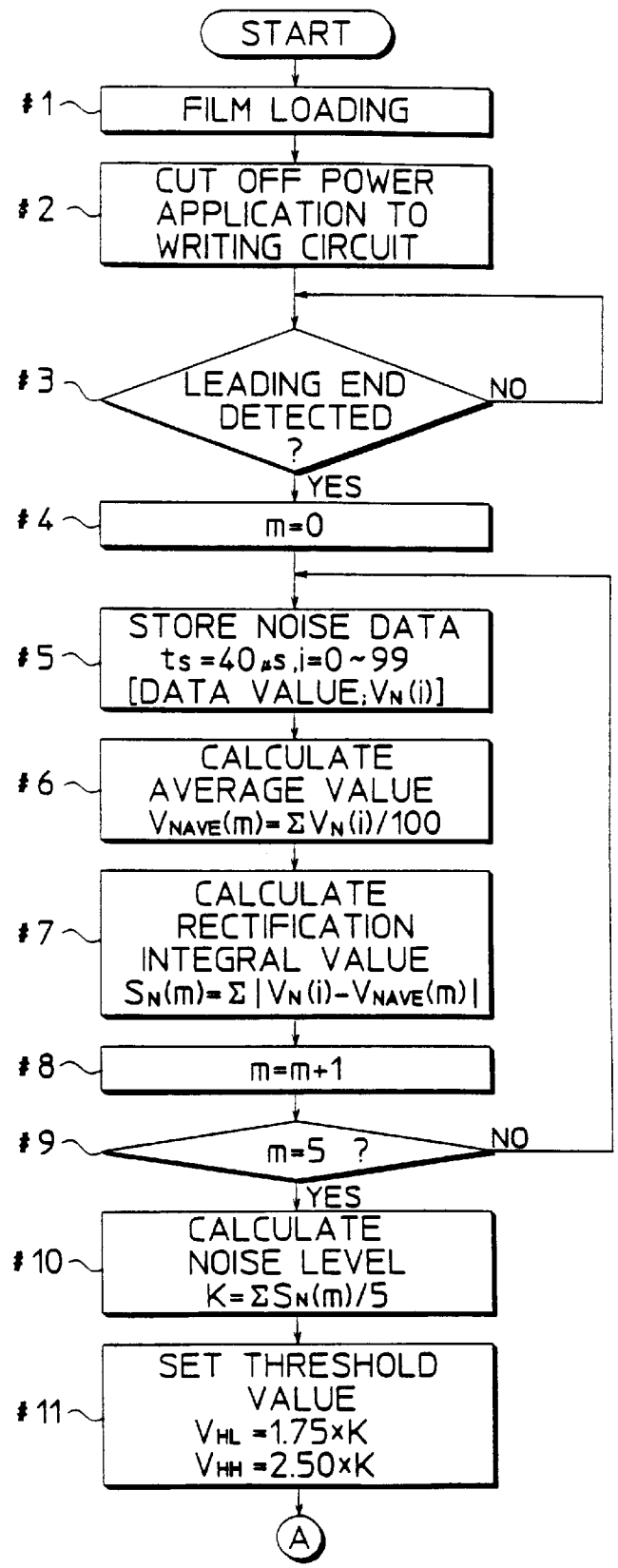
FIGS. 10 to 13 are a flowchart showing a control sequence of a film frame judgment processing.
Figure 11:
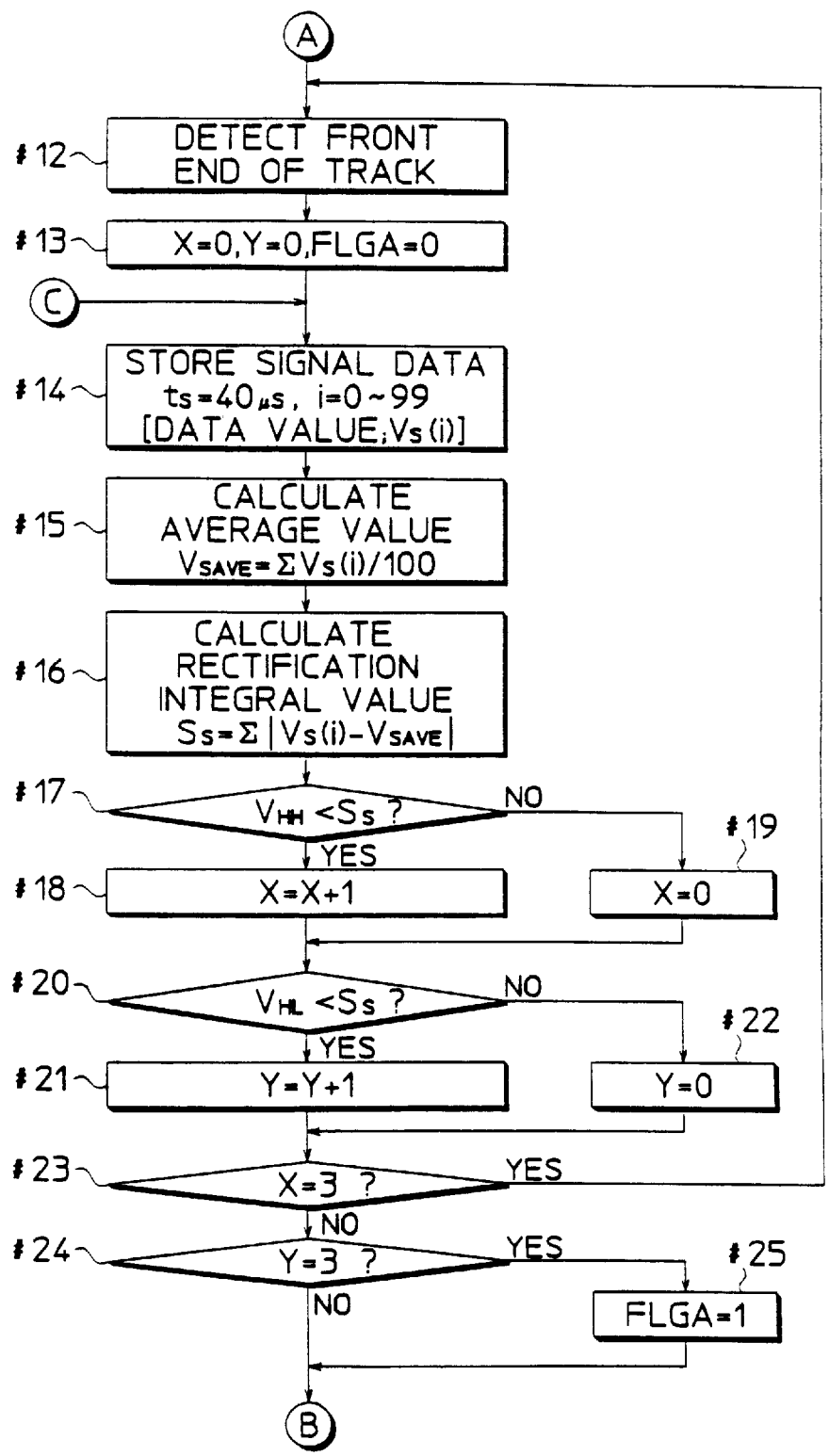
Figure 12:
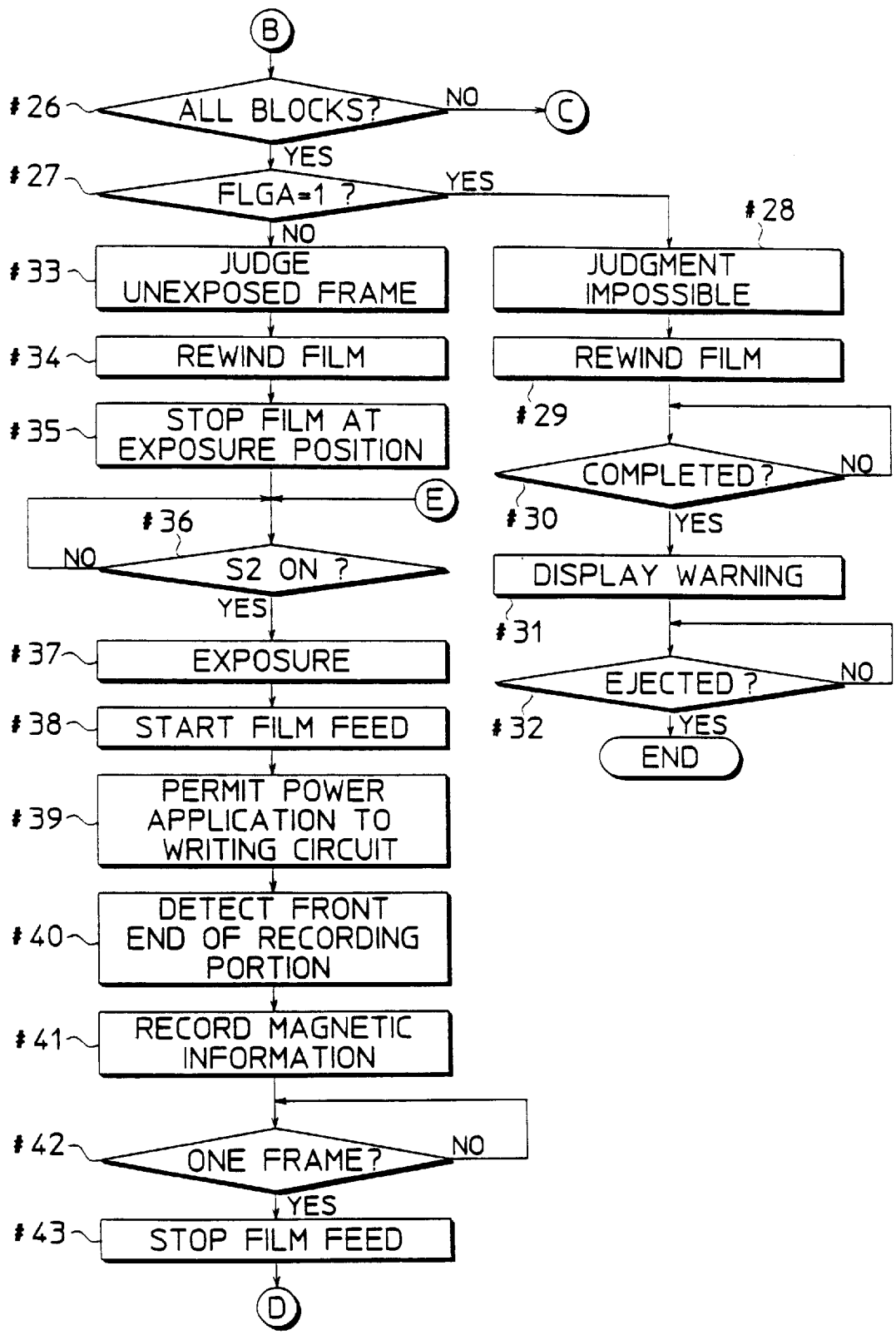
Figure 13:
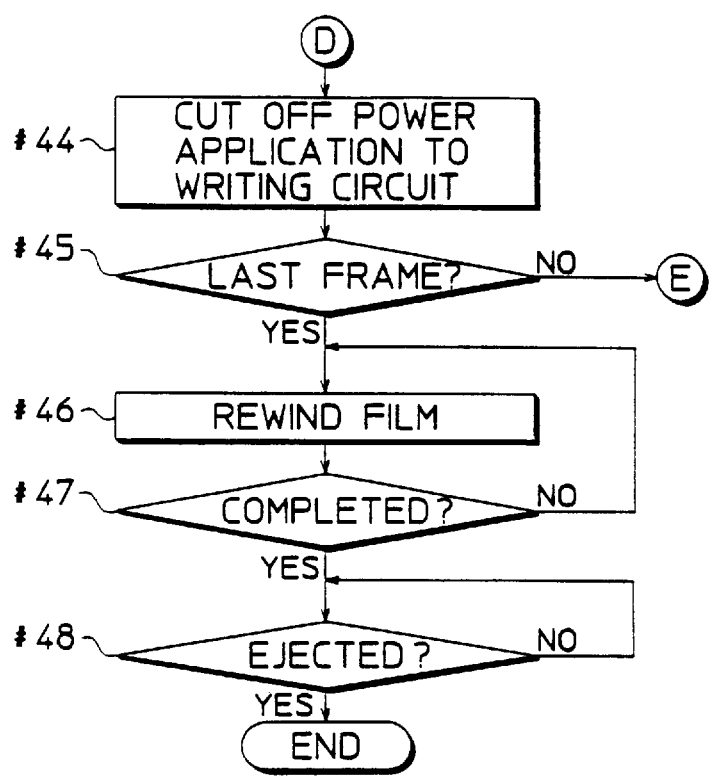

The rectification integral value of the detection signal is used for the following reason. According to a method for comparing the levels of the detection signal, the detection signal of the Ix-signal may erroneously be judged to be a noise in the case that the level of the detection signal of the Ix-signal is substantially as low as a noise level as shown in FIGS. 8 and 9. However, if the rectification integral value is used, the level of the detection signal of the Ix-signal is considerably higher than that of the detection signal of the noise. Accordingly, an error judgment can securely be prevented.

FIG. 8 is a waveform chart showing an exemplary detection signal of noise, and FIG. 9 is a waveform chart showing an exemplary detection signal in the case that the Ix-signal having a low level is detected. Since a fluctuating cycle is higher than a noise even if the maximum level of the detection signal of the Ix-signal is approximately equal to the noise level, the detection signal of the Ix-signal is higher than that of the noise after the rectification integration.

The integral values of the plurality of blocks are averaged to prevent the noise level K from abnormally increasing when an unexpected external noise accidentally enters. In this embodiment, particularly in order to prevent a level abnormality caused by an unexpected external noise resulting from a commercial frequency (60 Hz/50 Hz), the integral values of five blocks are averaged to obtain an average value over a duration of at least 20 ms or longer.

For the similar reason, the integral value of the plurality of blocks except the maximum and minimum values may be averaged; the maximum and minimum integral values may be averaged; or a median may be used as an average value.

The threshold level setter 201D is adapted to set the threshold data $V_{HL}$ (=a1×K), $V_{HH}$ (=a2×K) by multiplying the noise level K by specified coefficients a1, a2, respectively. The lower the level of the signal $S_P$ detected in the magnetic recording portion Fc may be, the more difficult it is to judge whether the detection signal represents the noise or the Ix-signal. In order to make an accurate judgment even in such a case, two kinds of threshold data $V_{HL}$, $V_{HH}$ are set. The coefficients a1, a2 are empirically set in view of the characteristics of the magnetic head 4, the level of the external noise, and other factors. In this embodiment, a1=1.75 and a2=2.5.

The block length setter 202 is adapted to divide the magnetic recording portion Fc into a plurality of blocks. The setter 202 has a built-in reference clock; generates the sampling clock SCK in accordance with the reference clock and outputs it to the A/D converter 19; and sets a block length, i.e. a detection time T of the detection signal $S_P$ in accordance with the sampling clock SCK. In this embodiment, the detection time T for one block is set at 4 ms, and the detection signal SP is A/D converted every 40 $\mu$s so that 100 digital data V(0) to V(99) are read for each block.

The magnetic signal detector 203 generates a data used to compare the threshold data $V_{HL}$, $V_{HH}$ based on the signal $S_P$ detected by scanning the magnetic recording portion Fc by the magnetic head 4. This data is also generated block by block and output to the unexposed frame judger 204.

The magnetic signal detector 203 includes, as shown in FIG. 6, an average value calculator 203A, a rectification integrator 203B, a signal level calculator 203C and a memory 203E. The average value calculator 203A, the rectification integrator 203B and the memory 203E function in the corresponding manner as the average value calculator 201A, the rectification integrator 201B and the memory 201E of the threshold level calculator 201. More specifically, the memory 203E is adapted to store the digital signal $S_P$ (signal obtained by scanning the magnetic recording portion Fc) input from the A/D converter 19 for each block length. The average value calculator 203A calculates an average level $V_{SAVE}$ of the digital signal $S_P$ for each block. The rectification integrator 203B applies a full wave rectification to the digital signal $S_P$ on the basis of the average level $V_{SAVE}$ and integrates this rectification signal.

The unexposed frame judger 204 classifies the signal levels of the respective blocks into three levels ($S_S \leq V_{HL}$, $V_{HL} < S_S$, $V_{HH} < S_S$) by comparing each integral value $S_S$ based on the signal $S_P$ obtained by scanning the magnetic recording portion Fc for each block with the threshold data $V_{HL}$, $V_{HH}$, and judges based on this classification results whether the frame Fa corresponding to this magnetic recording portion Fc is an unexposed frame or an exposed frame or cannot be judged. In this embodiment, if there are three or more consecutive blocks of $V_{HH} < S_S$, the frame Fa is judged to be an exposed frame. If there are three or more consecutive blocks of $V_{HL} < S_S$ although there are no three consecutive blocks of $V_{HL} < S_S$, no judgment is possible for the frame Fa. Unless otherwise, the frame Fa is judged to be an unexposed frame.

The number of the consecutive blocks is set at three or more for the following reason. For example, concerning a noise resulting from a vertical synchronization signal of a television, a noise resulting from a vertical synchronization signal of one cycle is normally frequently counted for the integral value $S_S$. With such an unexpected noise having a relatively high level, it is considered that two consecutive blocks of $V_{HH} < S_S$ may exist, but that three or more of such consecutive blocks are highly unlikely to exist. It should be noted that the number of consecutive blocks is not limited to three, but may be four or more.

Next, the film frame judgment and the film photographing information write control are specifically described with reference to a flowchart shown in FIGS. 10 to 13.

The frame judgment is made during the film loading performed when the film cartridge 30 is loaded in the film chamber in order to feed the film F until the first unexposed frame reaches the specified image recording position, that is, the exposure aperture 51, in the case that a partly exposed film is loaded. Further, the film photographing information is written while the film F is fed by one frame after an exposure is made to the frame. The flowchart shown in FIGS. 10 to 13 is a control sequence of the film loading including the frame judgment and the photographing following thereafter.

Concerning the film loading, when the film cartridge 30 is loaded in the film chamber, the torque transmission mechanism 10 is set in the thrust mode for the film loading, and the film F is thrusted out of the film cartridge 30 by rotating the fork 12 by the torque of the motor 6 (Step #1). The control signal $S_C$ of low level is then output to the magnetic signal writing circuit 5A and power application to the magnetic signal writing circuit 5A is cut off (Step #2). Subsequently, when the leading end of the thrusted out film F is detected by the PI 3 (YES in Step #3), a count value m of a counter for counting the number of blocks is set to "0" (Step #4), and the signal $S_P'$ detected by the read coil 4B of the magnetic head 4 is read for five block lengths (read time 5T=20 ms) (a loop of Steps #5 to #9). During the read time 5T, the detection signal $S_P'$ is the detection signal of noise since the film F has not yet reached the magnetic head 4.

The detection signal $S_P'$ is then A/D converted into digital data $V_N(i)$ in sampling cycle ts=40 $\mu$s by the A/D converter 19 and is stored in the memory 201E per block length (one block length T, the number of data i=0 to 99). The detection signal $S_P'$ is also converted into a rectification integral value $S_N(m)$ (m=0 to 4) by the average calculator 201B and the rectification integrator 201B (Steps #5 to #7).

Figure 14:
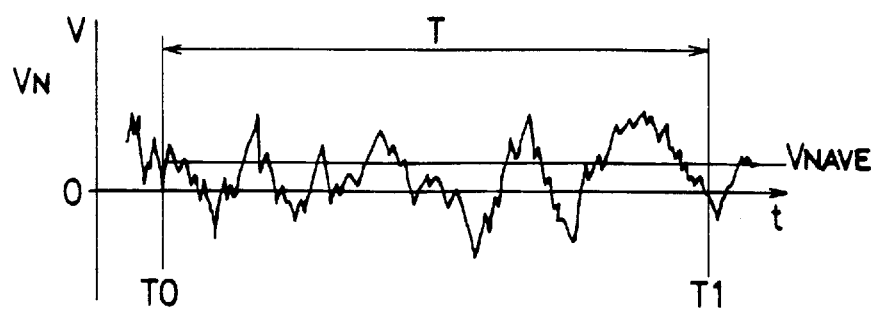
FIG. 14 is a waveform chart showing an average value calculation over one block length of a detection signal of noise.
Figure 15:
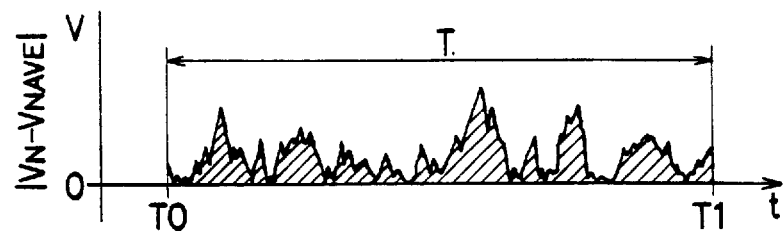
FIG. 15 is a waveform chart showing a rectification integration over one block length of the detection signal of noise.

The rectification integral value $S_N(m)$ of each block is calculated as follows. The average level $V_{NAVE}(m)(=\Sigma V_N(i)/100$, i=0 to 99, m=0 to 4) for each block length T of the detection signal $S_P'$ is calculated as shown in FIG. 14 (Step #6). Further, as shown in FIG. 15, after a full wave rectification is applied to the detection signal $S_P'$ using the average level $V_{NAVE}$ as a reference level, the signal level is integrated (corresponding to a hatched area of FIG. 15) to obtain the rectification integral value $S_N(m)$ of the block. The above rectification integration is performed by calculating absolute values of differences $|V_N(i)-V_{NAVE}(m)|$ between the data $V_N(i)$ read from the memory 201E and the average level $V_{NAVE}(m)$ by the rectification integrator 201B and adding these absolute values ($\Sigma|V_N(i)-V_{NAVE}(m)|$, i=0 to 99, m=0 to 4).

Figure 16:
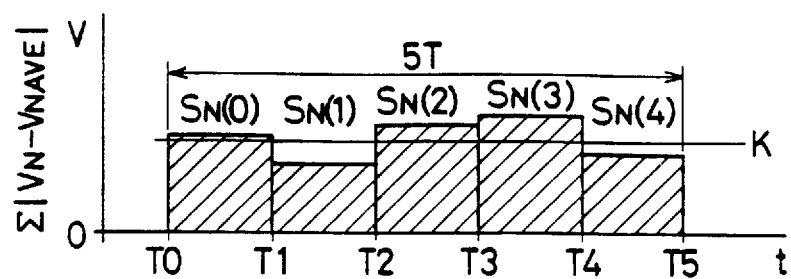
FIG. 16 is a graph showing a noise level calculation for the frame judgment.

When the calculation of the rectification integral values $S_N(0)$ to $S_N(4)$ of five blocks is completed (YES in Step #9), the noise level calculator 201C calculates an average value K of these rectification integral values ($\Sigma S_N(m)/5$, m=0 to 4) as a noise level as shown in FIG. 16 (Step #10), and the threshold level setter 201D sets the threshold values $V_{HL}$, $V_{HH}$ by multiplying the average value K by the coefficients a1, a2, respectively (Step #11). FIG. 16 is a bar graph showing the rectification integral values $S_N(0)$ to $S_N(4)$ corresponding to periods T0 to T1, T1 to T2, . . . , T4 to T5, and the level K is an average value of the rectification integral values $S_N(0)$ to $S_N(4)$.

Figure 18:
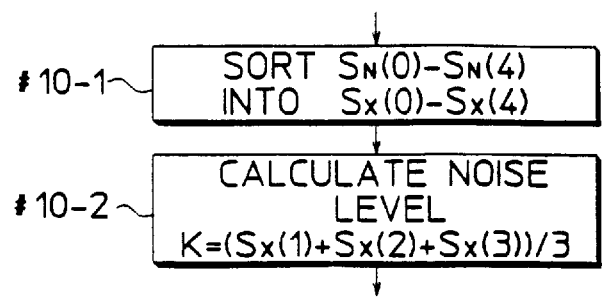
FIG. 18 is a flowchart showing a modification of Step #10 of the control sequence.

It may be appreciated to average those of the rectification integral values $S_N(0)$ to $S_N(4)$ except maximum and minimum values as shown in FIG. 18, instead of the averaging of all the rectification integral values $S_N(0)$ to $S_N(4)$. Specifically, in Step #10-1, the rectification integral values $S_N(0)$ to $S_N(4)$ of the five blocks are sorted in the order of higher value. A result of the sorting is represented as an arrangement of $Sx(0)>Sx(1)>Sx(2)>Sx(3)>Sx(4)$. In Step #10-2, the maximum and minimum values $Sx(0)$ to $Sx(4)$ are removed and an average value K of the remaining values $Sx(1)$ to $Sx(3)$ is calculated as a noise level: $K(=Sx(1)+Sx(2)+Sx(3)/3)$.

Figure 19:
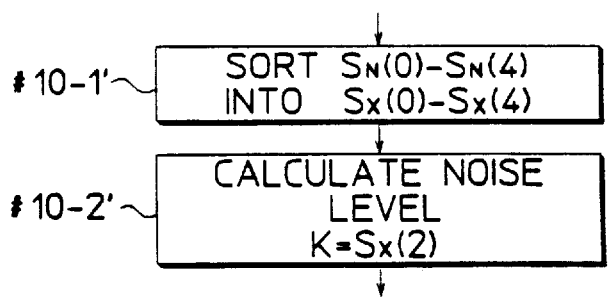
FIG. 19 is a flowchart showing another modification of Step #10 of the control sequence.
Figure 20:
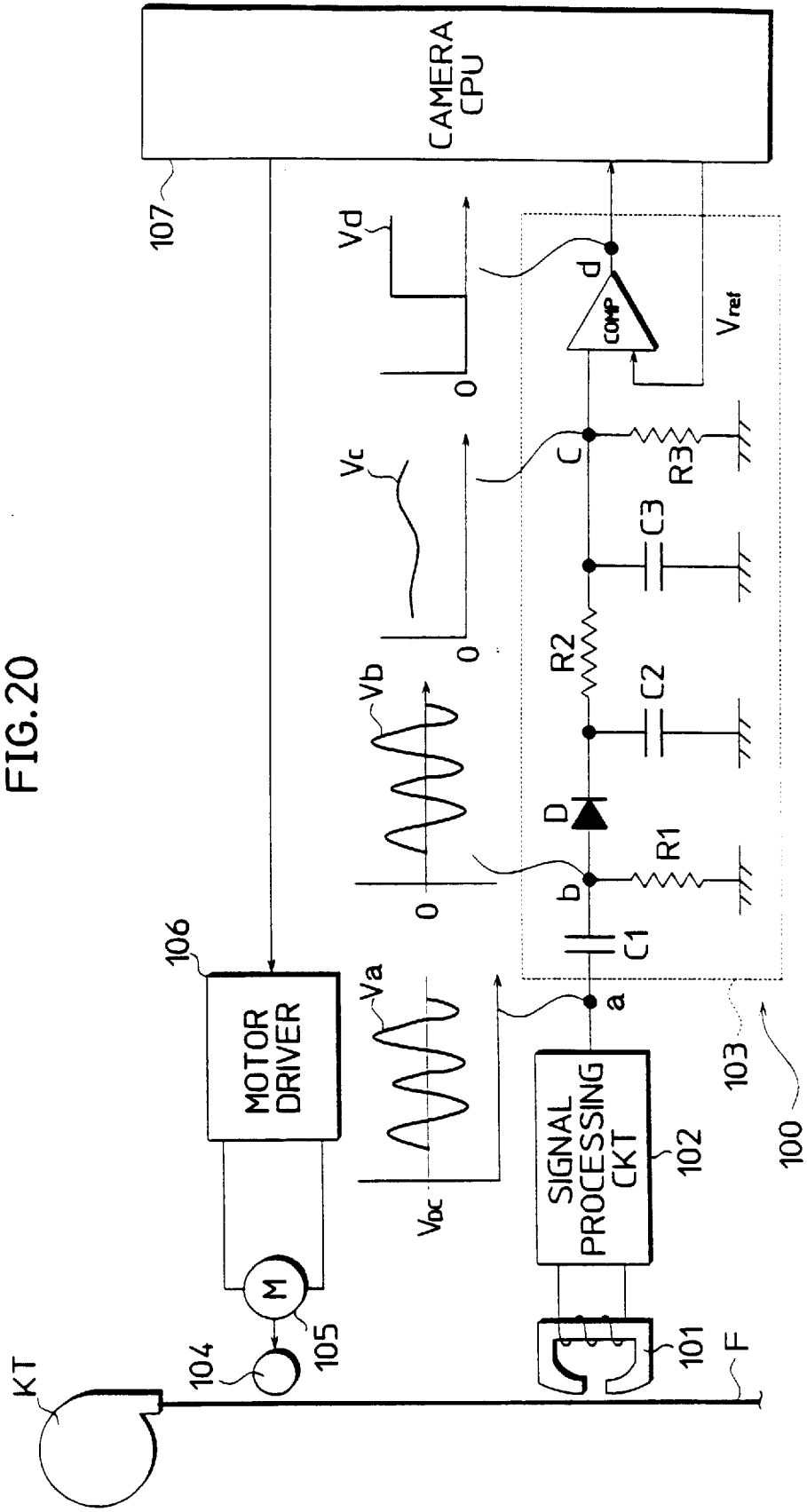
FIG. 20 is a circuit construction diagram of a magnetic signal judger in a prior art film frame judgment device.
Figure 21:
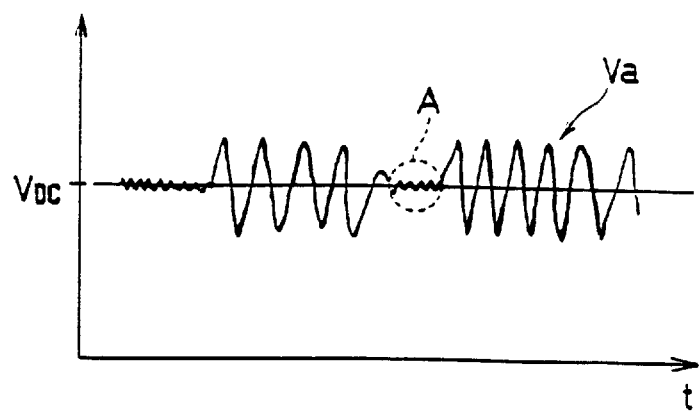
FIG. 21 is a waveform chart of a magnetic signal in which a film photographing information is lacking.
Figure 22:
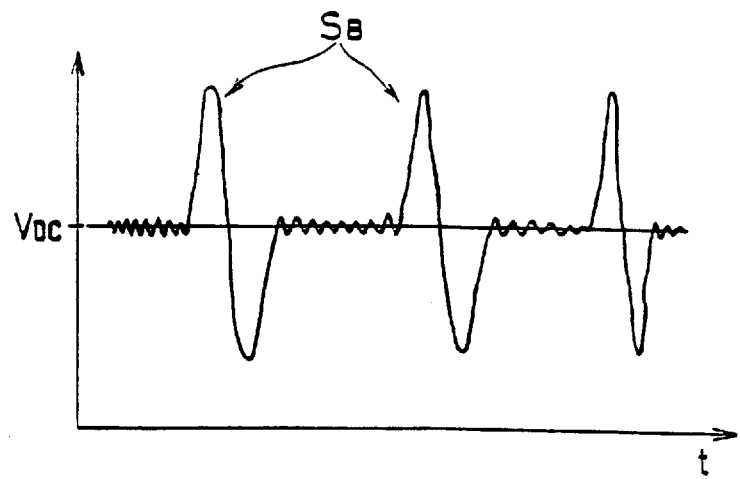
FIG. 22 is a waveform chart of a magnetic signal influenced by a burst type noise.

Further, it may be appreciated to use a median as an average value as shown in FIG. 19, instead of the averaging of all the rectification integral values $S_N(0)$ to $S_N(4)$. Specifically, in Step #10-1', the rectification integral values $S_N(0)$ to $S_N(4)$ of the five blocks are sorted in the order of higher value similarly to Step #10-1 to obtain an arrangement of $Sx(0)>Sx(1)>Sx(2)>Sx(3)>Sx(4)$. In Step #10-2', the median value $Sx(2)$ is used as a noise level.

Subsequently, when the front end position of the magnetic recording portion Fc (the front end position of the magnetic track) corresponding to the leading frame of the frame Fa is detected after the film F is fed by a specified distance (distance d) in accordance with the detection signal of the perforation Fb by the PI 2 (Step #12), a count value X of a counter for counting the number of consecutive blocks having a level in excess of the threshold level $V_{HH}$ and a count value Y of a counter for counting the number of consecutive blocks having a level in excess of the threshold level $V_{HL}$ in the signal $S_P$ detected by scanning the magnetic recording portion Fc by the magnetic head 4 are both set to "0", and a flag FLGA representing that the judgment is impossible is reset to "0" (Step #13).

Subsequently, the signal $S_P$ detected via the read coil 4B of the magnetic head 4 and the magnetic signal reading circuit 5B are stored in the memory 203E after being A/D converted for each block length (one block length T, number of data i=0 to 99) by the A/D converter 19 (Step #14). Then, the rectification integral values $S_S$ of the respective blocks are calculated by the calculation similar to the one for the detection signal $S_P'$ of noise (Steps #15, #16).

More specifically, the average level $V_{SAVE}$ ($=\Sigma V_S(i)/100$, i=0 to 99) is calculated by the average value calculator 203A (Step #15). Further, the rectification integrator 203B reads the respective data $S_S(i)$ from the memory 203E, and calculates the rectification integral value $S_S$ by adding the absolute values of differences $|V_S(i)-V_{SAVE}|$ between the data $V_S(i)$ read from the memory 203E and the average level $V_{SAVE}$ (Step #16).

Subsequently, the unexposed frame judger 204 compares the rectification integral value $S_S$ with the threshold levels $V_{HH}$ (Step #17) and $V_{HL}$ (Step #20) to classify in which ranges of $S_S \leq V_{HL}$, $V_{HL}<S_S$, $V_{HH}<S_S$ the rectification integral value $S_S$ of that block falls. Depending on the classification results, the count value X of the consecutive blocks of $V_{HH}<S_S$ is changed (Step #18 or #19) or reset to "0" (Step #19), and the count value Y of the consecutive blocks of $V_{HL}<S_S$ is changed (Step #21 or #22). More specifically, if $V_{HH}<S_S$ (YES in Step #17), the count value X is incremented by "1" (Step #18). If $S_S \leq V_{HH}$ (NO in Step #17), the count value X is reset to "0" (Step #19). Further, if $V_{HL}<S_S$ (YES in Step #20), the count value Y is incremented by "1" (Step #21). If $S_S \leq V_{HL}$ (NO in Step #20), the count value Y is reset to "0" (Step #22).

It is then judged whether the count value X has reached "3", i.e. there have been three consecutive blocks having a level in excess of the threshold level $V_{HH}$ (Step #23). If X=3 (YES in Step #23), Step #12 follows upon the judgment that the frame corresponding to this magnetic recording portion Fc is an exposed frame, and the same frame judgment as above is made for the next frame (Steps #12 to #23).

On the other hand, unless X=3 (NO in Step #23), it is judged whether the count value Y has reached "3", i.e., there have been three consecutive blocks having a level in excess of the threshold level $V_{HL}$ although there have been no three consecutive blocks having a level in excess of $V_{HH}$ (Step #24). If Y=3 (YES in Step #24), Step #26 follows after the flag FLGA is set to "1" (Step #25). Unless Y=3 (NO in Step #24), Step #26 directly follows.

Figure 17:
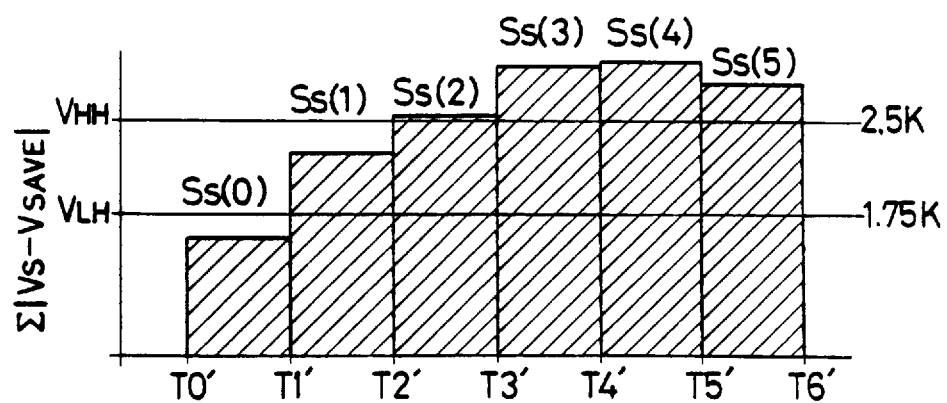
FIG. 17 is a graph showing an exemplary variation of the rectification integral value of a detection signal calculated by the block.

FIG. 17 is a graph showing an exemplary variation of the rectification integral values $S_S$ of the detection signal $S_P$ calculated block by block. Specifically, FIG. 17 is a bar graph showing the rectification integral values $S_S(0)$, $S_S(1)$, $S_S(2)$, ... $S_S(5)$ corresponding to periods T0' to T1', T1' to T2', ... T5' to T6'. In this example, since the rectification integral values $S_S(3)$ to $S_S(5)$ of the signals $S_P$ continuously read by scanning the magnetic recording portion Fc are consecutively in excess of the threshold level $V_{HH}$, the frame Fa corresponding to this magnetic recording portion Fc is judged to be an exposed frame. On the other hand, if the rectification integral value $S_S(3)$ is: $V_{HL} \leq S_S(3)<V_{HH}$, no three consecutive rectification integral values are in excess of the threshold level $V_{HH}$, but three or more consecutive rectification integral values are in excess of the threshold level $V_{HL}$ ($S_S(1)$ to $S_S(3)$), no frame judgment is judged to be possible. If there are only two consecutive blocks having a level in excess of the threshold value $V_{HL}$, the frame corresponding to this magnetic recording portion Fc is judged to be an unexposed frame upon the judgment that the Ix-signal is not recorded therein.

Referring back to FIG. 12, it is judged whether the frame judgment has been made for all blocks of the magnetic recording portion Fc (Step #26). If the frame judgment has not yet been made for all blocks of the magnetic recording portion Fc (NO in Step #26), this routine returns to Step #14 and the classification of the rectification integral value and the frame judgment are performed for the next block (Steps #14 to #26).

Upon the completion of the frame judgment for all blocks of the magnetic recording portion Fc (YES in Step #26), it is judged whether the flag FLGA is set at "1" (Step #27). If the flag FLGA is set at "1" (YES in Step #27), the frame judgment is judged to be impossible (Step #28). Then, the drive mode for the torque transmission mechanism 10 is set to the film rewind mode (Step #29) and the film F is rewound by rotating the fork 12 in the reverse direction by the torque of the motor 6 (Step #30). Upon the completion of the rewinding (YES in Step #30), a warning "Frame Judgment Impossible" is displayed in a display device provided on the camera main body (Step #31). When the film cartridge 30 is ejected (YES in Step #32), the film loading and the frame judgment are completed.

On the other hand, unless the flag FLGA is set at "1" (NO in Step #27), the frame Fa corresponding to the magnetic recording portion Fc is judged to be an unexposed frame (Step #33) and the film F is rewound by one frame to position the exposure area of the frame Fa with respect to the exposure aperture 51. Specifically, the drive mode for the torque transmission mechanism 10 is set to the film rewind mode, and the film F is rewound by rotating the fork 12 in the reverse direction by the torque of the motor 6 until the perforation Fb representing the front end position of this frame Fa is detected by the PI 2 (Steps #34, #35). Consequently, the film loading and the frame judgment are completed.

Subsequently, when the photographing is performed by pressing an unillustrated release switch S2 (YES in Step

36), an image is recorded in the leading unexposed frame in the image recording position (Step #37). Thereafter, the drive mode for the torque transmission mechanism 10 is set to the film wind mode to start the feed of the film F by one frame by driving the motor 6 (Step #38). Simultaneously, the control signal $S_c$ of high level is output to the magnetic signal writing circuit 5A, and power application to the circuit 5A is permitted (Step #39). This is because the film photographing information corresponding to the frame Fa to which an exposure was made is written while the film F is fed by one frame.

Subsequently, when the front end position of the magnetic recording portion Fc is detected by feeding the film F by a specified amount (Step #40), the write data is output from the write data generator 18 to the magnetic signal writing circuit 5A, and the film photographing information is recorded in this magnetic recording portion Fc (Step #41). When the perforation Fb representing the front end position of the next frame Fa is detected by the PI 2 (YES in Step #42), the motor 6 is stopped to stop the feed of the film F (Step #43). Then, power application to the magnetic signal writing circuit 5A is interrupted (Step #44) and it is judged whether an exposure has been made to the last frame (Step #45). Unless an exposure has been made to the last frame (NO in Step #45), Step #36 follows and the film photographing information is recorded in the magnetic recording portion Fc every time an exposure is made to the frame by repeating the above operations (a loop of Steps #36 to #45).

When all frames are exposed (YES in Step #45), the drive mode for the torque transmission mechanism 10 is set to the film rewind mode and the film F is rewound by rotating the fork 12 in the reverse direction by the torque of the motor 6 (Steps #46, #47). Upon the completion of the rewinding (YES in Step #47), the recording of the film photographing information in association with the photographing operation is completed by ejecting the film cartridge 30 (YES in Step #48).

As described above, a film having recording portions in correspondence to the respective frames for recording information concerning an exposure made to the frames is fed by the film feeder. The film frame judgment device judges, based on the signal detected by relatively scanning the recording portion by the information reader, whether an exposure can be made to the frame corresponding to this recording portion.

Specifically, first and second threshold values for the judgment set based on the signal detected in a scanning position of the information reader outside the recording portions. The detection signal obtained by scanning the recording portion is converted into a rectification integration signal for each of a plurality of blocks, and then these rectification integration signals are compared with the first and second threshold values to classify the signals level of the respective blocks into three ranges. Based on the classification result, the frame corresponding to this recording portion is judged to be an exposed frame when there are a specified number or more consecutive blocks having an integral value in excess of the second threshold value, and the judgment is judged to be impossible when there are a specified number of more consecutive blocks having an integral value in excess of the first threshold value although there are no specified number or more blocks having an integral value in excess of the second threshold value.

In this way, the frame corresponding to the magnetic recording portion is judged to be exposed or unexposed, or no judgment is judged to be possible. Accordingly, even in the case that the level of the recording signal representing the recorded information is approximately as low as noise level or in the case that a burst type noise is generated due to a vertical synchronization signal of a television, the recording signal can securely be detected without erroneously judging a noise as such, and whether each frame is exposed or not can accurately be judged.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An apparatus comprising:

a feeder which feeds a film having a magnetic recording portion;

a reader which magnetically scans the magnetic recording portion to generate scan signals; and a judger which executes a first comparison and a second comparison to make judgment as to which of first, second, and third cases:

the first case being that the magnetic recording portion has been recorded with magnetic data the second case being that the magnetic recording portion has not been recorded with magnetic data; and the third case being that the first and second cases cannot be discriminated;

the first comparison comparing a scan signal from each of a plurality of blocks of the magnetic recording portion with a first predetermined level;

the second comparison comparing a scan signal from each of the plurality of blocks of the magnetic recording portion with a second predetermined level, the second predetermined level being lower than the first predetermined level; and the first comparison being given higher priority than the second comparison.

2. An apparatus according to claim 1, wherein the judger makes a judgment of:

the first case when scan signals are in a first condition of being above the first predetermined level over a specified number of continuous blocks;

the third case when scan signals are in a second condition of being below the first predetermined level and above the second predetermined level over a specified number of continuous blocks; and the second case when scan signals are in the other condition.

3. An apparatus according to claim 1, wherein the first predetermined level is a threshold value for judging whether scan signals are in connection with magnetic data, and the second predetermined level is a threshold value for judging whether scan signals are in connection with noise.

4. An apparatus according to claim 1, which is a camera.

* * * * *